United States Patent
Weiss et al.

(10) Patent No.: US 12,488,451 B2
(45) Date of Patent: Dec. 2, 2025

(54) HIGH RESOLUTION TRACEABILITY

(71) Applicant: CYBORD LTD., Tel Aviv (IL)

(72) Inventors: Eyal Isachar Weiss, Bnei Reem (IL); Zeev Efrat, Ramat Hasharon (IL)

(73) Assignee: CYBORD LTD, Tel Aviv (IL)

(*) Notice: Subject to any disclaimer, the term of this patent is extended or adjusted under 35 U.S.C. 154(b) by 0 days.

(21) Appl. No.: 18/862,538

(22) PCT Filed: May 4, 2023

(86) PCT No.: PCT/IL2023/050458
§ 371 (c)(1),
(2) Date: Nov. 3, 2024

(87) PCT Pub. No.: WO2023/214416
PCT Pub. Date: Nov. 9, 2023

(65) Prior Publication Data
US 2025/0148583 A1   May 8, 2025

Related U.S. Application Data

(60) Provisional application No. 63/338,926, filed on May 6, 2022.

(51) Int. Cl.
*G06T 7/00* (2017.01)
*G06F 40/205* (2020.01)
(Continued)

(52) U.S. Cl.
CPC .......... *G06T 7/0004* (2013.01); *G06F 40/205* (2020.01); *G06F 40/30* (2020.01);
(Continued)

(58) Field of Classification Search
CPC ..... G06T 7/0004; G06F 40/205; G06F 40/30; G06V 10/82; G06V 30/1985
See application file for complete search history.

(56) References Cited

U.S. PATENT DOCUMENTS 4,710,895 A * 12/1987 Maegawa ............... G06F 3/007
365/2
5,751,910 A    5/1998 Bryant et al.
(Continued)

FOREIGN PATENT DOCUMENTS

CN       108665072      10/2018
EP       1212606 B1      6/2022
(Continued)

OTHER PUBLICATIONS

International Search Report and Written Opinion dated Jul. 29, 2020 for PCT Application No. PCT/IL2020/050397 filed Apr. 1, 2020.
(Continued)

*Primary Examiner* — Kevin Ky
(74) *Attorney, Agent, or Firm* — A.C. Entis-IP Ltd; Allan C. Entis

(57) ABSTRACT

A system for monitoring for an electronic circuit production line, the system comprising: at least one imaging system operable to acquire an image of a packaging unit (PU) label labeling a PU in which an electronic component that the production line includes in an electronic circuit is packaged by a supplier for delivery to an enterprise that operates the production line, and during production of the circuit at least one image of the component; and a processing and data hub having software configured to process the images to: determine a PU data record having logistical data fields comprising logistical data characterizing the PU and the component packaged in the PU; determine an encapsulation data record having logistical data fields comprising logistical data characterizing an encapsulation package of the component; and store the PU and encapsulation data records in a memory.

21 Claims, 4 Drawing Sheets

(51) Int. Cl.
- *G06F 40/30* (2020.01)
- *G06V 10/82* (2022.01)
- *G06V 30/196* (2022.01)

(52) U.S. Cl.
CPC .......... *G06V 10/82* (2022.01); *G06V 30/1985* (2022.01); *G06T 2207/30141* (2013.01)

(56) References Cited

U.S. PATENT DOCUMENTS

| | | | | |
|---|---|---|---|---|
| 5,974,169 | A | * | 10/1999 | Bachelder ................. G06T 7/12 382/199 |
| 6,023,663 | A | | 2/2000 | Kim |
| 6,075,881 | A | * | 6/2000 | Foster ..................... G06V 10/44 382/206 |
| 6,137,893 | A | * | 10/2000 | Michael ................... G06T 7/80 382/199 |
| 7,496,892 | B2 | * | 2/2009 | Nuss ........................ G06F 8/31 709/200 |
| 9,410,898 | B2 | | 8/2016 | Ikushima |
| 2004/0078584 | A1 | * | 4/2004 | Moroney ............. H04N 21/835 375/E7.009 |
| 2004/0143352 | A1 | | 7/2004 | Gyorfi et al. |
| 2006/0173654 | A1 | | 8/2006 | Apps et al. |
| 2011/0102575 | A1 | | 5/2011 | Case et al. |
| 2013/0284803 | A1 | | 10/2013 | Wood et al. |
| 2014/0281964 | A1 | | 9/2014 | Ullrich et al. |
| 2015/0078518 | A1 | | 3/2015 | Tziazas et al. |
| 2015/0339862 | A1 | | 11/2015 | Skaaksrud |
| 2016/0088264 | A1 | | 3/2016 | Freeze |
| 2016/0282394 | A1 | | 9/2016 | House et al. |
| 2017/0032285 | A1 | | 2/2017 | Sharma et al. |
| 2017/0330201 | A1 | | 11/2017 | Shaapur et al. |
| 2018/0025487 | A1 | * | 1/2018 | Macdonald .............. B07C 3/08 348/91 |
| 2018/0031449 | A1 | | 2/2018 | Cloake |
| 2018/0101945 | A1 | | 4/2018 | Stone et al. |
| 2019/0007416 | A1 | * | 1/2019 | Ackley ............... G06F 11/3006 |
| 2019/0213733 | A1 | | 7/2019 | Yati |
| 2020/0068759 | A1 | | 2/2020 | Cvijetinovic et al. |
| 2020/0082546 | A1 | | 3/2020 | Cui et al. |
| 2020/0090003 | A1 | * | 3/2020 | Marques ............. G06Q 20/4016 |
| 2020/0294505 | A1 | * | 9/2020 | Shen ....................... G10L 15/22 |
| 2020/0356741 | A1 | | 11/2020 | Principato |
| 2020/0364817 | A1 | | 11/2020 | Liu et al. |
| 2021/0397717 | A1 | * | 12/2021 | Shwartz ............. G06Q 10/0635 |
| 2022/0164483 | A1 | | 5/2022 | Weiss et al. |
| 2022/0293105 | A1 | * | 9/2022 | Tang ..................... G06N 3/08 |
| 2023/0129202 | A1 | | 4/2023 | Weiss et al. |
| 2023/0351194 | A1 | * | 11/2023 | Wright ................. G06F 16/285 |
| 2024/0061974 | A1 | * | 2/2024 | Otsuki ................... G06F 30/20 |

FOREIGN PATENT DOCUMENTS

| | | |
|---|---|---|
| KR | 101993705 B1 | 6/2019 |
| WO | 2013116256 | 8/2013 |
| WO | 2015157526 | 10/2015 |
| WO | 2017201489 | 11/2017 |
| WO | 2020011447 | 1/2020 |
| WO | 2020048119 | 3/2020 |
| WO | 2020202154 | 10/2020 |
| WO | 2021250679 | 2/2021 |

OTHER PUBLICATIONS

International Search Report and Written Opinion dated Jul. 15, 2021 for PCT Application No. PCT/IL2021/050409 filed Apr. 8, 2021.
Daniel Singer. This AI Startup Keeps Counterfeit Components Out of Your Gadgets [retrived 1-27 on Nov. 13, 2019]. retrived from <https://www.startuphub.ai/this-ai-startup-keeps-counterfeit-components-out-of-your-gadgets> Daniel Singer, Nov. 19, 2019 (Nov. 13, 2019).
International Search Report and Written Opinion dated Aug. 25, 2021 for PCT Application No. PCT/IL2021/050708 filed Jun. 10, 2021.
European Supplamental Search Report dated Nov. 25, 2022 for Corresponding European Application No. 20782042.4 filed Apr. 1, 2020.
International Search Report dated Aug. 17, 2023 International application PCT/IL2023/050458 filed May 4, 2023.
US Office Action dated Jan. 19, 2024 for U.S. Appl. No. 17/599,603, filed Sep. 29, 2021.
Supplementary/Extended Search Report dated Jan. 26, 2024 for European Application No. 21821205.8, filed Jan. 13, 2023.
Ning San Chang, SMV—A Computer Vision Program for Loading Surface Mount Components, vol. 0557, Dec. 19, 1985, pp. 1-6.
European Extended Search Report dated Apr. 11, 2024 for European application 21785725.9 filed Oct. 31, 2022.
International Search Report and Written Opinion dated Jun. 13, 2024 for PCT Application No. PCT/IL24/50206 filed Feb. 22, 2024.
International Written Opinion dated Sep. 12, 2024 for PCT Application No. PCT/IL2023/050458 filed May 4, 2023.
International Preliminary Report on Patentatbility dated Oct. 27, 2024 for PCT Application No. PCT/ IL2023/050458 filed May 4, 2023.
Office Action dated Mar. 26, 2025 for U.S. Appl. No. 17/911,658, filed Sep. 15, 2022.
Office Action dated Mar. 4, 2025 for U.S. Appl. No. 18/009,999, filed Dec. 13, 2022.
Search Report dated Aug. 4, 2025 for European Application No. 23799388.6 filed Nov. 5, 2024.

\* cited by examiner

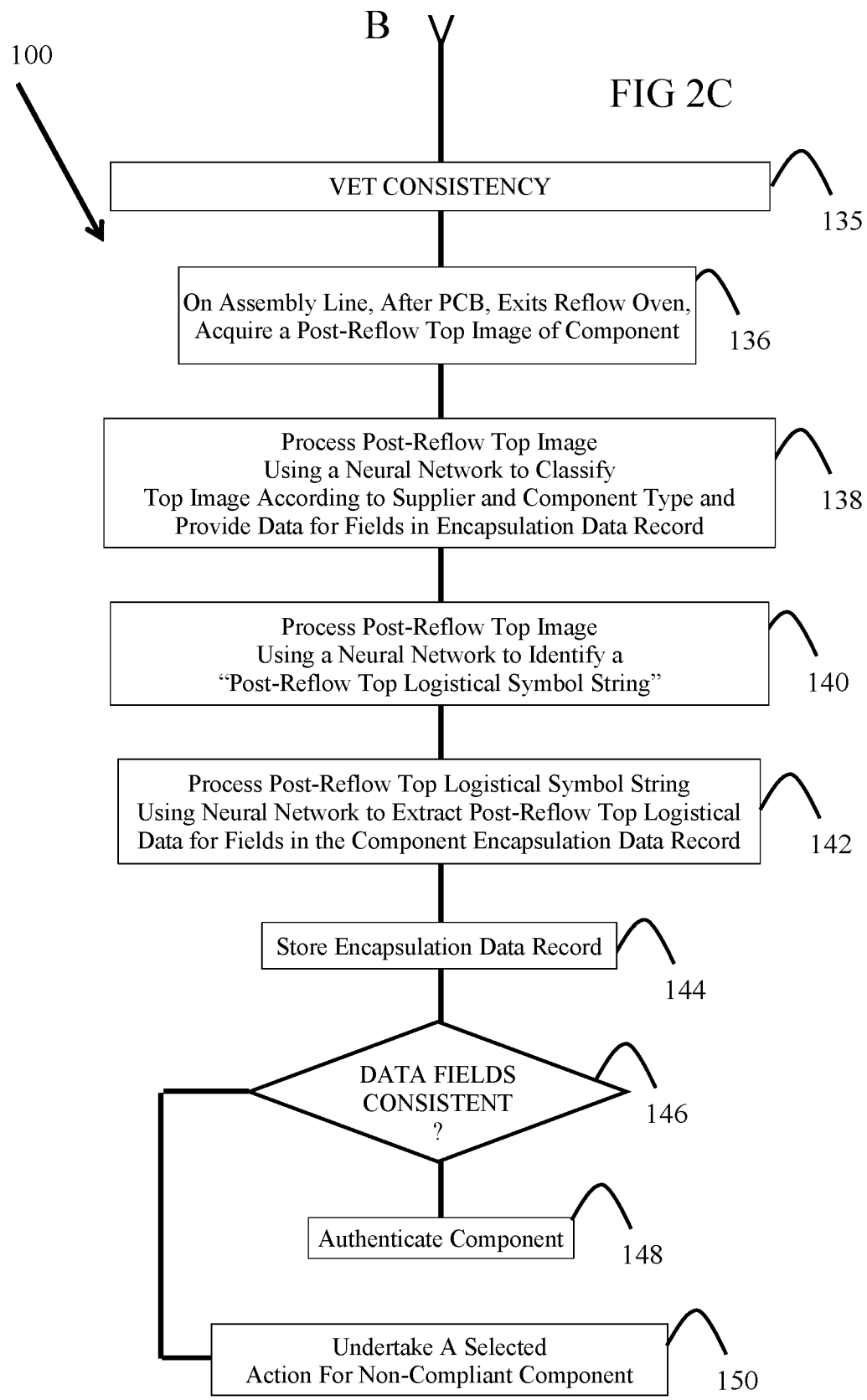

HIGH RESOLUTION TRACEABILITY

RELATED APPLICATIONS

The present application is a US National Phase of PCT application No. PCT/IL2023/050458 filed May 4, 2023, which claims benefit under 35 U.S. C. 119(e) from U.S. Provisional Application 63/338,926 filed May 6, 2022, the disclosures of which are incorporated herein by reference in their entirety.

FIELD

Embodiments of the invention relate to traceability for electronics manufacturing.

BACKGROUND

Traceability in manufacturing refers to an ability to identify a particular component of a manufactured product and trace the component history in the manufacturing process of the product back to an advantageous point of entry of the component into the manufacturing process. Typically, the point of entry is the component origin, and traceability data comprises at least a component ID, a date of production of the component, generally defined by a manufacturing lot number, and an ID and location of the component's producer.

In the electronics industry the origin data is generally included in logistical data in a printed label of a packaging unit (PU) in which a quantity of electronic components is packaged by the component manufacturer for delivery to a manufacturer that uses the components to produce electronic circuits. Even though modern electronic components are typically relatively small, some logistical data is generally also provided on the individual components.

For the highly automated, predominant method of manufacturing printed circuit board (PCB) electronic circuits referred to as surface mounted technology (SMT) electronic components are automatically placed and electrically connected to conductive traces on a PCB. The components are provided in PUs that are configured ready for mounting to pick and place robots that remove the components from the PUs and carefully position the components at their designated locations on the PCB. SMT ready PUs may be in the form of reels, trays, stick magazines, or bulk.

Whereas the PUs and electronic components that different component manufactures supply are labeled with the same type of logistical data, there is no standard labeling format for the logistical data. Each component manufacturer uses its own label formats and methods of applying the labels to the PUs and the individual component encapsulation package. There are thousands of component manufacturers, millions of different components, and thousands of different component encapsulation package form factors for encapsulating components. Furthermore processes used in automated methods of electronic circuit production, such as reflow processes used in SMT manufacturing, may degrade labeling of component encapsulation package. As a result, using PU and component encapsulation package labeling to provide robust and accurate traceability suitable to the scale of mass production that characterizes modern electronic manufacturing and the need to assure public safety and minimize damage from recalls is a complex challenge.

SUMMARY

An aspect of an embodiment of the disclosure relates to providing a high resolution traceability system, optionally referred to as a HiTrace system or simply "HiTrace", that provides robust, accurate traceability data for identifying and determining origin data for a component of a PCB electronic circuit.

In an embodiment, HiTrace comprises an optionally at least partially cloud based data and processing hub and at least one imaging system. The at least one imaging system is operable to acquire an image of a label, hereinafter a PU label, that labels a PU comprising electronic components to be affixed to a PCB by, optionally an SMT production line, and images of the top and bottom of electronic components from the PU that are affixed to the PCB. In an embodiment the at least one imaging system is operable to acquire a bottom image of a component from the PU before the component is placed on the PCB by a pick and place (P&P) machine in the SMT production line, a top image of the component after the component is placed on the PCB, and an image of the top of the component after the PCB has passed through a soldering reflow oven that solders and affixes the component to the PCB. The hub comprises data and/or executable instructions, hereinafter referred to as software, for processing the PU label, and markings exhibited in the top and bottom images of the component to extract logistical data from the labels.

In an embodiment the hub software comprises a neural network (NN) for identifying symbol strings in the labels, and a deep neural network natural language processor (DNN-NLP) for parsing the symbol strings and determining the semantics of the parsed strings to extract logistical data from the images for a data record identifying the component. In an embodiment the hub software comprises a classifier, optionally a deep neural network (DNN), trained to process the top and/or bottom images of the component to classify the component encapsulation package and physical condition, and associate the encapsulation package with a supplier and/or manufacturer of the component. In an embodiment, the hub selects the NN for identifying the symbol strings and the DNN-NLP from a plurality of neural networks responsive to the classification provided by the classifier.

In an embodiment the hub processes features provided by the classifier and the extracted logistical data to determine if the extracted logistical data and encapsulation package features are internally consistent and consistent with production line assembly set-up data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIGS. 2A-2C show a flow diagram illustrating operation of HiTrace to extract logistical traceability data for an electronic component being affixed to a PCB, in accordance with an embodiment of the disclosure.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment in an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily required, configuration of possible embodiments of the disclosure. Each of the verbs, "comprise" "include" and "have", and conjugates thereof, are used to indicate that the object or objects of the verb are not necessarily a complete listing of components, elements or parts of the subject or subjects of the verb. Unless otherwise indicated, the word "or" in the description and claims is considered to be the inclusive "or" rather than the exclusive or, and indicates at least one of, or any combination of more than one of items it conjoins.

Figure 1:
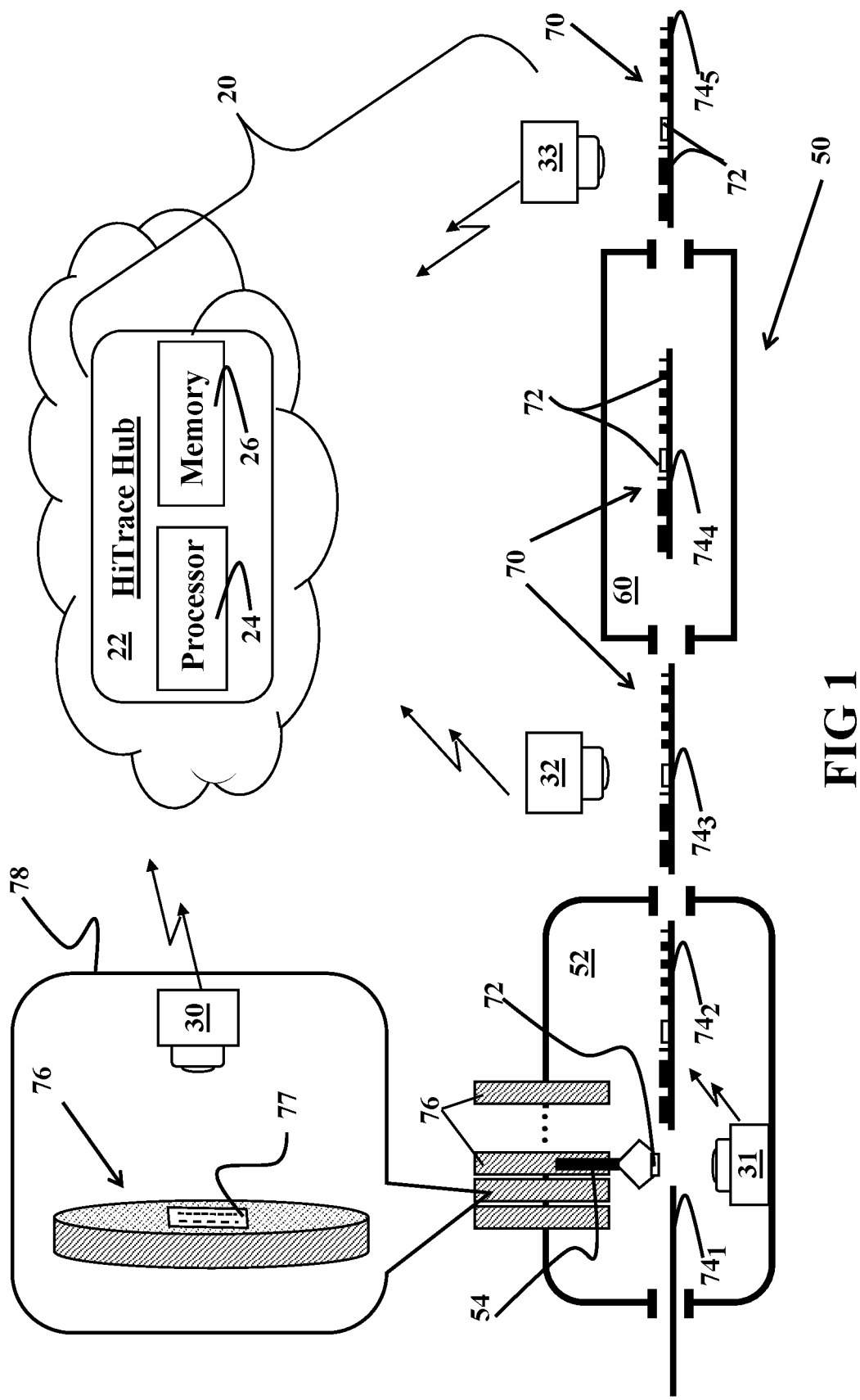
FIG. 1 schematically shows a HiTrace system monitoring an SMT production line and providing electronic components used by the line in production of circuits with traceability data in accordance with an embodiment of the disclosure.

FIG. 1 schematically shows a HiTrace system 20 in accordance with an embodiment of the disclosure monitoring an optionally SMT production line 50 to provide traceability for electronic components that the SMT line incorporates into electronic circuits that the SMT line produces.

SMT production line 50 is shown very schematically and includes a P&P machine 52 and a reflow oven 60. The production line is shown producing electronic circuits 70 comprising components 72 that SMT line 50 affixes to PCBs 741, 742, . . . , 745. The PCBs are generically referenced by numeral 74. The subscript distinguishing a given PCB references a location of the given PCB along SMT line 50 and a production stage of a circuit 70 being produced on the given PCB at the location in the SMT line at which the given PCB is shown.

P&P machine 52 is assumed to be configured to receive components 72 from component reels and the P&P machine is shown loaded with a plurality of component reels 76. An enlarged image of a component reel 76 showing a reel label 77 labeling the reel and comprising logistical data associated with components 72 that the reel contains is shown in an inset 78. The P&P machine comprises a P&P head 54 for removing components 72 from reels 76 and placing the components on PCB boards 74. P&P head 54 is shown holding a component 72 removed by the head from a reel 76 for placement by the head on a PCB 74. In FIG. 1 PCB 741 is shown bare of electronic components and entering P&P machine 52 to be provided with components 72 by P&P head 54. PCB 742 is shown after having received components 72 and about to exit SMT machine 52. PCB 743 is shown just prior to entering reflow oven 60. PCB 744 is shown located in reflow oven 60 to have components 72 affixed to conductive traces on PCB 744 by reflow of solder. PCB 745 is shown after exiting reflow oven 60 and having components affixed to the PCB.

HiTrace 20 optionally comprises a cloud based processing and data hub 22, a PU imaging system represented by and referred to as a PU camera 30 shown in an inset 78 and three SMT line imaging systems represented by and referred to as line cameras 31, 32, and 33. PU camera 30, as schematically shown in inset 78 operates to acquire images of labels 77 labeling reels 76 that are received by a manufacturing enterprise operating SMT production line 50 to produce circuits 70. Line camera 31 operates to acquire bottom images of a component 72 held by P&P head 54. Line camera 32 operates to acquire a top image of a component 72 after placement on a PCB 74 and before the PCB enters reflow oven 60. Line camera 33 operates to acquire a top image of a component 72 after the PCB 74 on which the component is placed has exited reflow oven 60. Optionally camera 31, 32, and/or 33, is an automated optical inspection camera of SMT production line 50.

Cameras 30-33 are controlled to upload data from images that they acquire to HiTrace hub 22 for processing to provide traceability for components 72. Hub 22 comprises and/or has access to at least one processor 24 and at least one memory 26 for use in supporting functionalities that the hub provides and processing the data to provide traceability. Optionally, the data that camera 30, 31, 32, and/or 33 uploads comprises the images acquired by the camera substantially as acquired. In an embodiment the camera preprocesses the images and uploads the preprocessed images and/or data that the camera extracts from the images by preprocessing to HiTrace hub 22.

Figure 2A:
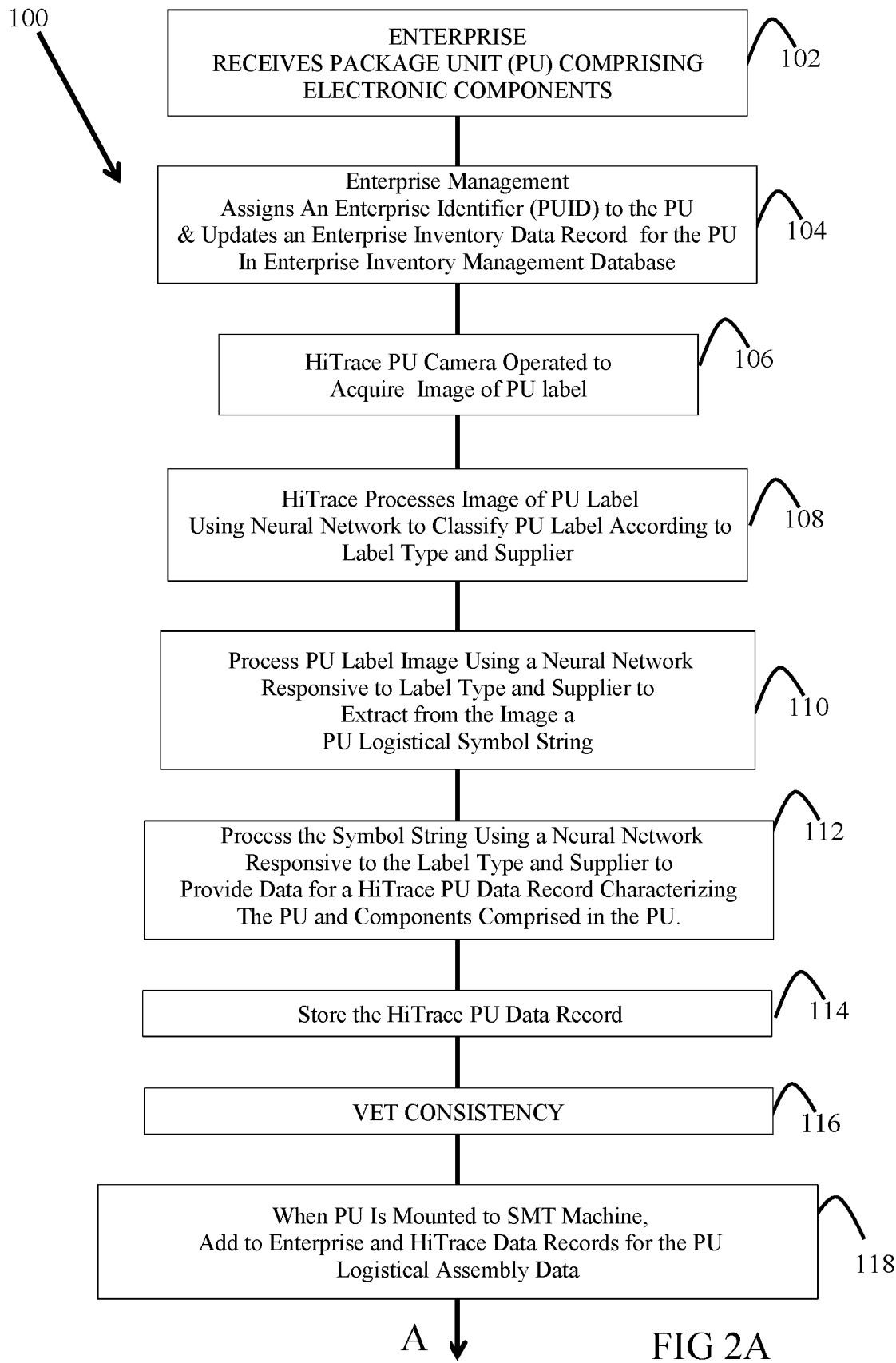
Figure 2B:
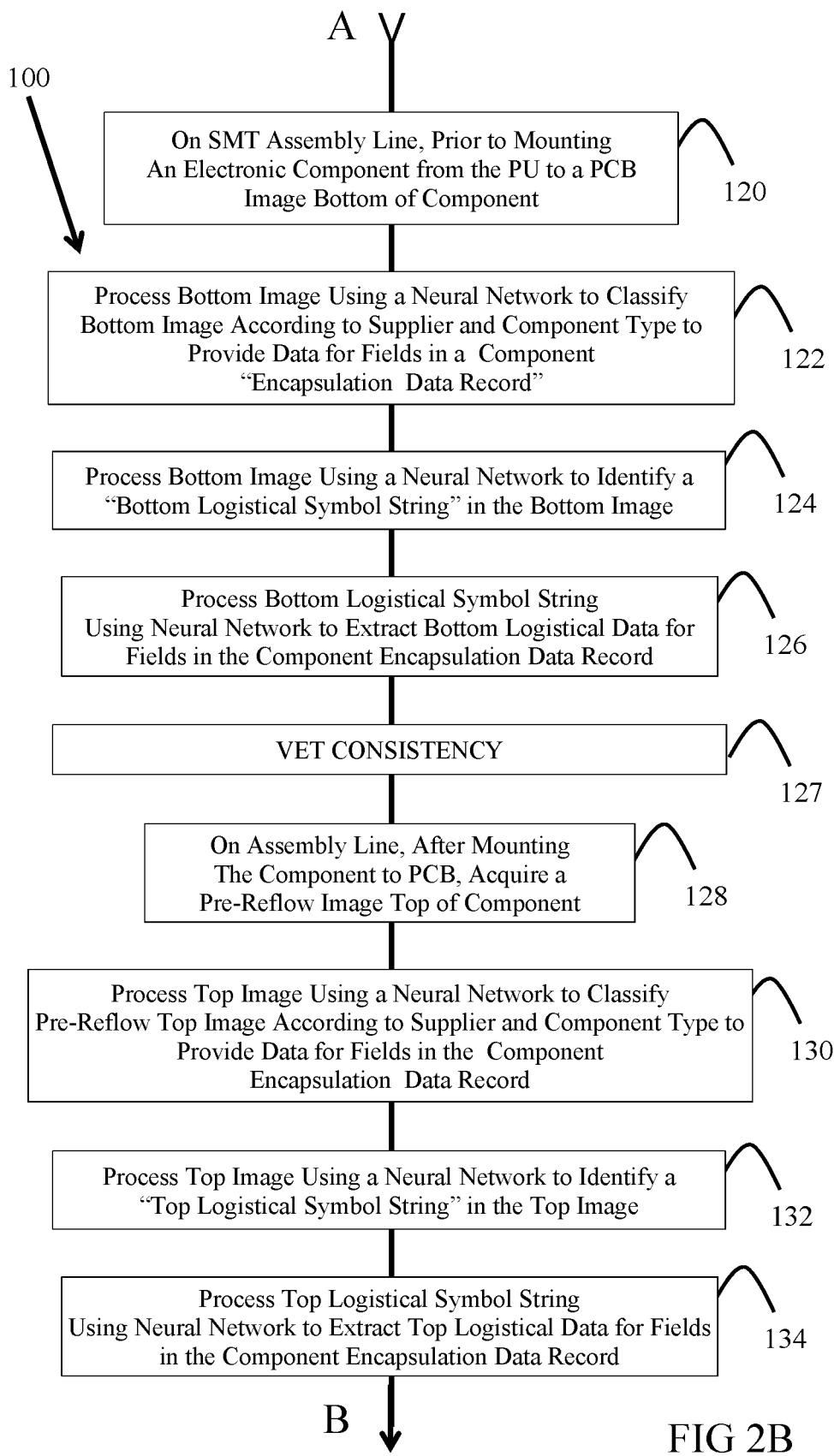

Operation of HiTrace 20 and hub 22 in processing label images provided by PU camera 30, bottom images provided by line camera 31, and top images provided by line cameras 32 and 33 to monitor and/or provide traceability for components 72 is illustrated by way of example by a flow diagram 100 shown in in FIGS. 2A-2C.

In a block 102 an enterprise that operates SMT line 50 receives a PU, for example PU 76 (FIG. 1), comprising electronic components that the SMT line requires to produce electronic circuits, such as circuits 70. Optionally, in a block 104 a back office of the enterprise management assigns a PU enterprise identifier, a "PUID", to the received PU and updates an enterprise inventory data record associated with the received PU in an enterprise inventory management database to log in delivery of the PU and logistical data associated with delivery. The enterprise inventory data record prior to delivery may comprise data from a purchase order for components in the delivered PU in logistical data fields of the inventory data record. After delivery, logistical data fields in the inventory data record may comprise data from a delivery note and a debit note for the components shipped in the PU, data from manufacturing and technical specifications for the components, and delivery data such as shipping data and delivery time of day and date (collectively, ToD) for the PU. Manufacturing data may comprise a geolocation and ID of a manufacturing facility that manufactured the components and a manufacturing lot number for the components. Specification data may comprise an ID for the components and a numerical value in units that specify a functionality of the components. In an embodiment HiTrace hub 22 is configured to have access to the enterprise inventory data records for electronic components that SMT 50 uses to produce electronic circuits and/or data from the records is uploaded from the enterprise to the hub.

In an embodiment optionally in a block 106 HiTrace PU camera 30 is operated to acquire an image of a PU label labeling the delivered PU, for example PU label 77 of PU 76 (FIG. 1, inset 78) and upload the image to hub 22. Optionally, in a block 108 hub 22 processes the uploaded image using a classifier to classify the label and associate the label to a supplier of electronic components and a type of label that the supplier uses to label PUs in which the supplier delivers electronic components. In an embodiment the classifier is a neural network trained on a plurality of supplier labels to classify the label and associate the label with the supplier and label type.

Optionally in a block 110, the hub uses a neural network to process the PU label and identify and determine a PU logistical symbol string on the label comprising symbols that encode logistical data associated with the electronic components comprised in the delivered PU. In an embodiment the neural network is a supplier specific neural network trained on PU labels from PUs that the supplier associated with the delivered PU in block 108 uses to deliver electronic components. In a block 112 hub 22 may use a deep neural net natural language processor (DNN-NLP) to parse the PU logistical symbol string and determine semantics of the parsed string to extract data from the symbol string for logistical data fields in a HiTrace PU data record characterizing the PU and components in the PU. In an embodiment the HiTrace PU data record comprises some of the same logistical data fields that the enterprise inventory data record comprises. In an embodiment the DNN-NLP is a supplier specific DNN-NLP trained on PU labels from PUs that the supplier associated with the delivered PU in block 108 uses to deliver electronic components. Optionally, the DNN-NLP comprises the neural network that determines the PU logistical symbol string in block 110 and the DNN-NLP performs the tasks indicated in both blocks 110 and 112.

Optionally, in a block 114 HiTrace hub 22 stores the HiTrace PU data record for the PU and electronic components in the PU in a HiTrace Traceability database in memory 26 for use in providing future traceability for the components. Optionally, in a block 116 HiTrace vets data in logistical data fields of the HiTrace PU data record to determine if the data is internally consistent and to determine if the data in the HiTrace PU data record is consistent with data for the PU in logistical data fields of the enterprise inventory data record for the PU. Optionally, vetting for consistency is performed in real time. If an inconsistency is identified, HiTrace may alert the enterprise to the inconsistency and that it may be advantageous to provide human intervention to undertake a suitable response to the inconsistency. A suitable response may by way of example comprise determining whether or not the inconsistency is a result of erroneous recording of data, precluding use of components in the PU, or undertaking remedial correction to defects in the components.

In a block 118 when the received PU is mounted to SMT machine 52 the enterprise inventory data record and the HiTrace PU data record for the PU and the component comprised in the PU are updated with logistical assembly set-up data. Logistical assembly data comprises data that defines features characterizing use of components from the PU in producing circuits 72. Assembly set-up data may comprise by way of an example, a ToD (time and time of day), at which the PU is mounted to SMT machine 52, an ID of SMT machine 52 and other equipment in SMT production line 50, and an ID identifying circuits 70 to which components in the PU are to be assembled.

In a block 120, inline camera 31 is controlled to acquire a bottom image of the electronic component as the component is held by P&P head 54, for example as shown in FIG. 1 for component 72, before the component is placed on a PCB 74, and optionally time stamps and uploads the image to HiTrace 20. In a block 122, HiTrace hub 22 processes the bottom image to determine data for logistical data fields of a component encapsulation data record. The data may comprise an identity of a component supplier consistent with the bottom image and data characterizing physical features of the component encapsulation imaged in the bottom image. In an embodiment the hub may use a neural network to classify the bottom image as to supplier, type, features imaged in the bottom image and status of the features to provide the data for the logistical data fields of the encapsulation data record for the component.

Optionally in a block 124 the hub uses a neural network to process the bottom image to identify a bottom logistical symbol string imaged in the bottom image and encoding logistical data associated with the component. In a block 126 the hub may process an identified bottom logistical string to parse the string and determine semantics of the parsed string to extract data characterizing the component from the symbol string for logistical data fields in the encapsulation data record. Optionally, the hub uses a DNN-NLP to parse and determine semantics of the bottom symbol string. Optionally, the DNN-NLP is selected from a plurality of neural networks responsive to the supplier and component type determined in block 122. Optionally, in a block 127 HiTrace vets data in logistical data fields of the HiTrace encapsulation data record to determine if the data is internally consistent and to determine if the data in the encapsulation data record is consistent with data for the PU in logistical data fields of the enterprise inventory data record for the PU. Optionally, vetting for consistency is performed in real time. If an inconsistency is identified, HiTrace may alert the enterprise to the inconsistency and that it may be advantageous to provide human intervention to undertake a suitable response to the inconsistency.

In an embodiment of the disclosure in a block 128, as illustrated by way of example in FIG. 1 for PCB 742, inline camera 32 may be controlled to acquire a pre-reflow top image of the component after the component has been placed on the PCB but before the PCB enters reflow oven 60, and time stamp and upload the pre-flow image to HiTrace 20. Optionally in acquiring the pre-flow top image, camera 32 images a plurality of components on PCB 742 and/or an ID of the PCB. In blocks 130-134 hub 22 may process the pre-reflow top image uploaded by camera 32 to provide data for data fields in the component encapsulation data record similarly to the manner in which the hub processes bottom image in blocks 122-126. In block 130, HiTrace hub 22 uses a neural network to classify the pre-reflow top image according to supplier and component type to provide data for fields in the component encapsulation data record. And in blocks 132 and 134 the hub uses a neural network to process the pre-reflow top image to identify a top symbol string image in the top image and optionally a DNN-NLP to extract top logistical data from the symbol string for fields in the component encapsulation data record. Optionally, in a block 135 HiTrace vets data in logistical data fields of the HiTrace encapsulation data record to determine if the data is internally consistent and to determine if the data in the encapsulation data record is consistent with data for the PU in logistical data fields of the enterprise inventory data record for the PU. Optionally, vetting for consistency is performed in real time. If an inconsistency is identified, HiTrace may alert the enterprise to the inconsistency and that it may be advantageous to provide human intervention to undertake a suitable response to the inconsistency.

In a block 136, inline camera 33 is optionally controlled to acquire a second top image, a post-reflow top image, of the electronic component after the PCB on which the component is located exits reflow oven 60, as shown for example in FIG. 1 for component 72 on PCB 745, Camera 33 optionally time stamps and uploads the image to HiTrace 20. Optionally in acquiring the post-reflow top image, camera 33 simultaneously images a plurality of components on PCB 745 and/or an ID of the PCB.

In blocks 138-142 hub 22 may process the post-reflow top image uploaded by camera 33 to provide data for data fields in the component encapsulation data record similarly to the manner in which the hub processes pre-reflow image in blocks 130-134. In block 138, HiTrace hub 22 uses a neural network to classify the post-reflow top image according to supplier and component type to provide data for fields in the component encapsulation data record. And in blocks 140 and 142 the hub uses a neural network to process the post-reflow top image to identify a post-reflow top symbol string image in the post-reflow top image and optionally a DNN-NLP to extract top logistical data from the symbol string for fields in the component encapsulation data record.

Optionally in a block 144 HiTrace stores the component encapsulation data record in the HiTrace Traceability database in memory 26 for future use in providing traceability for the components.

In a block 146 HiTrace hub 22 determines, optionally in real time, whether the data in logistical data fields extracted from bottom, pre-reflow, and post-reflow images of the component are internally consistent and consistent with the PU data record for the PU in which component was delivered. If no inconsistency is identified HiTrace proceeds to a decision block 148 and authenticates the component as acceptable for use. On the other hand, if an inconsistency is identified, HiTrace may proceed to a block 150 to optionally alert the enterprise to provide human intervention to undertake a suitable response to the inconsistency. A suitable response may by way of example comprise determining whether or not the inconsistency is a result of erroneous recording of data, precluding use of the component, or undertaking remedial correction of defects in the components.

It is noted that upon completion of a circuit 70, a HiTrace PU data record and a HiTrace encapsulation data record for components 72 that SMT line 50 affixes to the circuit provides robust, advantageous, end-to-end traceability for the components from their production to their inclusion in the completed circuit. It is further noted that PCB 74 and components 72 of a finished circuit 70 have passed though and undergone heating in reflow oven 60 that may alter and damage the integrity and form factor of the encapsulation package of a component 72 and render the encapsulation package of the component in the finished circuit difficult to identify with the component as originally supplied by a supplier. By providing an encapsulation data record optionally comprising data from pre-reflow and post-reflow top images of the component HiTrace improves the ability to identify a thermally damaged electronic component 72 with the component's original undamaged state and thereby may provide improved traceability for the component.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A system for monitoring for an electronic circuit production line, the system comprising:
   at least one imaging system operable to acquire at least one image of a packaging unit (PU) label labeling a PU in which an electronic component that the production line includes in an electronic circuit is packaged, and during production of the circuit at least one image of the component; and
   a processing and data hub having software comprising at least one neural network configured to process the image of the PU label to identify a supplier of the PU and a symbol string comprising at least one symbol imaged in the label, parse the symbol string and determine semantics of the parsed symbol string to provide logistical data characterizing the PU, and wherein the software is configured to:
      create a PU data record having logistical data fields comprising the logistical data characterizing the PU, and assembly line set-up data at a time at which the PU is mounted to a pick and place machine of the assembly line;
      process the at least one image of the component to create an encapsulation data record having logistical data fields comprising logistical data characterizing an encapsulation package of the component and identifying a supplier of the component;
      process the PU data record and encapsulation data records respectively for internal consistency and consistency of the PU data record with the encapsulation data record; and
      store the PU and encapsulation data records in a memory.

2. The system according to claim 1 wherein the at least one neural network comprises a deep neural network natural language processor (DNN-NLP) configured to provide the data for the logistical data fields.

3. The system according to claim 1 wherein the DNN-NLP is configured responsive to the identity determined from the at least one image of the PU.

4. The system according to claim 1 wherein the software comprises at least one neural network configured to process the at least one image of the component to identify a symbol string imaged in the at least one image, parse the symbol string and determine semantics of the parsed symbol string to provide data for the logistical data fields comprised in the encapsulation data record.

5. The system according to claim 4 wherein the at least one neural network comprises a deep neural network natural language processor (DNN-NLP) configured to provide the data for the logistical data fields of the encapsulation data record.

6. The system according to claim 5 wherein the at least one neural network comprises a neural network configured to process the at least one image of the component to determine an identity of the supplier.

7. The system according to claim 6 wherein the DNN-NLP is configured responsive to the identity determined from the at least one image of the component.

8. The system according to claim 1 wherein providing logistical data for a data record comprises providing the logistical data in real time.

9. The system according to claim 8 wherein the circuit is formed on a printed circuit board (PCB) and providing logistical data in real time comprises providing the data within a time period less than a small multiple of an average time required for a PCB on which the circuit is produced to pass through the production line.

10. The system according to claim 9 wherein the small multiple is less than 5.

11. The system according to claim 1 wherein the at least one image of the component comprises an image acquired prior to the component entering a solder reflow oven comprised in the production line.

12. The system according to claim 1 wherein the at least one image of the component comprises a bottom image and/or a top image of the component.

13. The system according to claim 1 wherein the software is configured to determine if the data in the PU and encapsulation data records is internally consistent.

14. The system according to claim 1 wherein the software is configured to determine if the data in the PU and encapsulation data records is consistent with enterprise inventory logistical data associated with the component.

15. The system according to claim 1 wherein the production line is a surface mounting technology (SMT) production line.

16. The system according to claim 1 wherein the at least one imaging system is operable to acquire a top pre-reflow image and a post-reflow image of the component and the encapsulation data record comprises data from pre-reflow and post-reflow top images of the component.

17. A method of monitoring an electronic circuit production line operated by an enterprise, the method comprising:
acquiring an image of a packaging unit (PU) label labeling a PU in which an electronic component that the production line includes in an electronic circuit is packaged by a supplier for delivery to an enterprise;
during production of the circuit acquiring at least one image of the component;
using a neural network to process the image of the PU label to identify a supplier of the PU and a symbol string comprising at least one symbol imaged in the label, parse the symbol string and determine semantics of the parsed symbol string to provide logistical data characterizing the PU;
creating a PU data record having logistical data fields comprising the logistical data characterizing the PU, the component packaged in the PU, and assembly line set-up data at a time at which the PU is mounted to a pick and place machine of the assembly line;
processing the at least one image of the component to create an encapsulation data record having logistical data fields comprising logistical data characterizing an encapsulation package of the component and identifying a supplier of the component;
processing the PU data record and encapsulation data records respectively for internal consistency and consistency of the PU data record with the encapsulation data record; and
storing the PU and encapsulation data records in a memory.

18. The method according to claim 17 wherein the at least one image of the component comprises a bottom image.

19. The method according to claim 17 wherein the at least one image of the component comprises a top image.

20. The method according to claim 17 wherein processing an image to determine the data record comprises using a deep neural network natural language processor (DNN-NLP) to process the image.

21. The method according to claim 17 wherein the encapsulation data record comprises data from pre-reflow and post-reflow top images of the component.

* * * * *